May 8, 1951 N. E. KLEIN 2,552,488
GEAR DRIVE FOR DIAL MECHANISMS
Filed Oct. 31, 1945

INVENTOR.
Norman E. Klein
BY
Ralph L Chappell
ATTORNEY

Patented May 8, 1951

2,552,488

UNITED STATES PATENT OFFICE 2,552,488

GEAR DRIVE FOR DIAL MECHANISMS

Norman E. Klein, Clemson, S. C., assignor to the United States of America as represented by the Secretary of the Navy Application October 31, 1945, Serial No. 625,887

4 Claims. (Cl. 74—10.8)

This invention pertains to the art of dials and finds particular application in a device for operating dials such as are employed in radios and like apparatus.

The invention comprises a drive embodying a gear train. The gear train of the disclosed embodiment comprises directly intermeshing gears, but it is to be understood that the scope of the invention encompasses gearing and gear trains in the broader sense of these terms, including such equivalents as sprockets, pulleys, sheaves, etc.

The gear train of the invention comprises a gear and a pinion with parallel axes, and constituting the driving and driven members of the train. The gear is larger than the pinion, and specifically in the disclosed embodiment the gear diameter is several times greater than the diameter of the pinion. This provides a gear ratio with a predetermined limited angular displacement of the gear for each revolution of the pinion, the total angular displacement of the gear being less than a complete revolution thereof and coincident with a plurality of revolutions of the pinion.

Such a drive mechanism is particularly useful in radios, for a diminutive angular displacement of an electrical member to be made manually by a much larger rotation of a knob, for example. This enables precise and accurate manual control. The gear, for example, can be keyed to the rotor shaft of a variable condenser, and the knob attached to the pinion, to enable accurate tuning.

The angular displacement of the gear is preferably limited to an amount less than a complete revolution, to indicate the angular displacement of the electrical device under control, the device being limited by its design to an arc of rotation less than a complete revolution. Pursuant to this purpose, stops are provided in the device of the present invention, the stops respectively being carried by the gear and the pinion, and being rotatable in a common plane on intersecting paths. The stop of the gear is positioned radially to rotate on a smaller circle than the gear diameter. The stop of the pinion is positioned radially to describe a circle that intersects the circle of rotation of the gear. The stops are positioned circumferentially of their respective circles of rotation to abut at one or the other or both intersections between circles, abutting engagement of the stops operating to hold the driving and driven elements against further rotation.

It will be understood that, excepting in the case of the circles of rotation intersecting at a point, they will intersect at two points on each of the described circles, and that these points will define arcs of intersection in both circles. In the practice of the invention of the disclosed embodiment, at least one of the stops is extended radially of the circle it defines to span both arcs, and by means of this construction the stops will abut wherever they happen to meet in the intersecting arcs.

Manual rotation of a knob, such as a radio dial knob, into abutting engagement of a pair of stops, may be sufficiently severe to dislocate adjustment of the electrical apparatus, or otherwise injure the equipment. To avoid this danger the device of the invention embodies a structure that operates to absorb the shock of the stops meeting in abutting engagement. Accordingly, a resilient connection is provided between the knob and the pinion.

Principles of the present invention, and the structure and operation of the disclosed practical embodiment thereof, will be better understood from the accompanying drawings. In the drawings—

Figures 1, 2, 3:
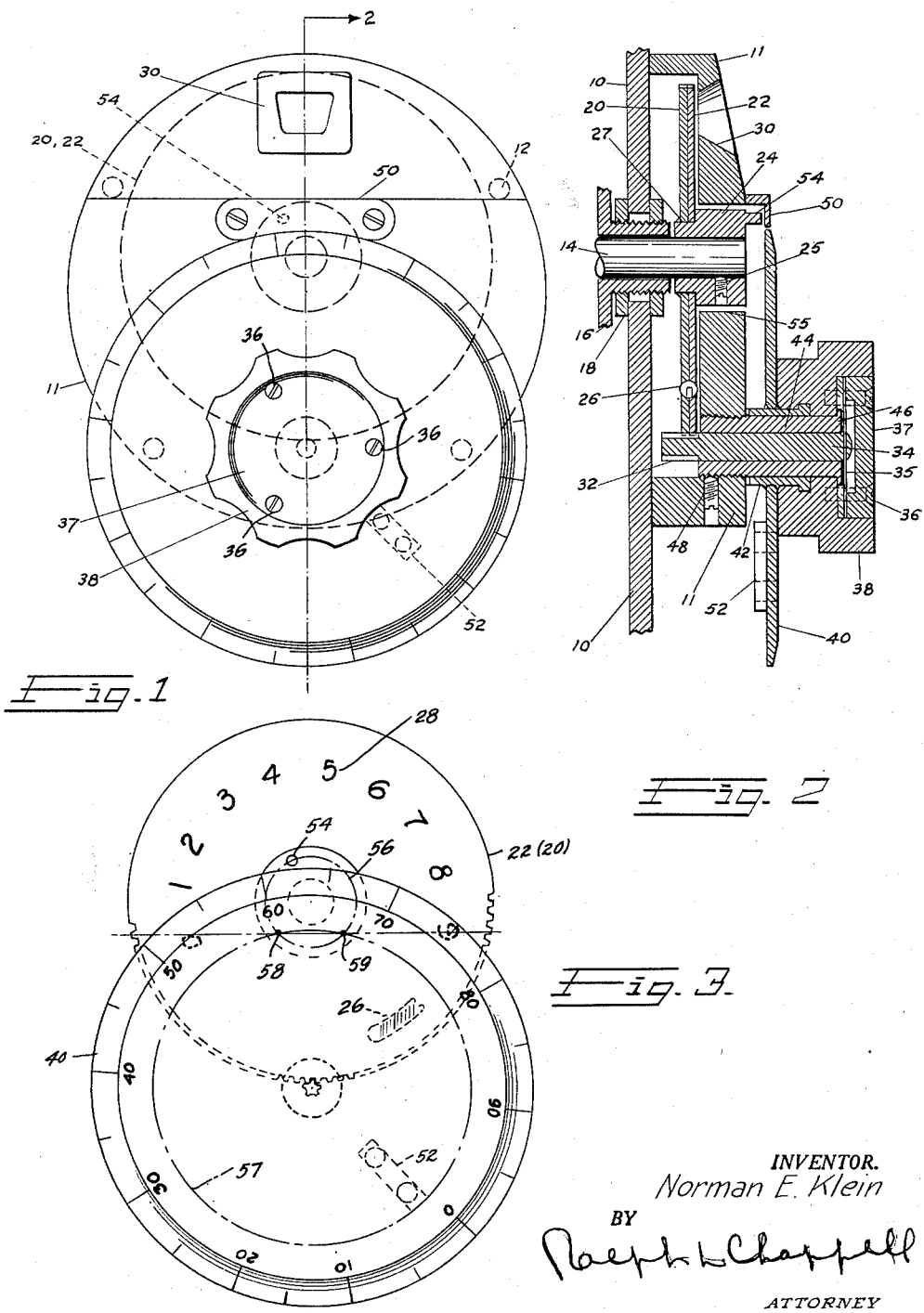
Fig. 1 is a front view of a radio dial embodying the invention.
Fig. 2 is a cross-sectional elevation taken on line 2—2 of Fig. 1.
Fig. 3 is a front elevation of the mechanism of Fig. 1, with parts removed to illustrate operation thereof.

The dial mechanism is mounted on a base 10, which may conveniently constitute the panel of a radio. The housing 11 is provided for the dial mechanism, and is attached to the panel, for example by the screws 12. In the case of the invention being embodied in a radio, the shaft 14 carries some electrical device thereof. By way of illustration, the shaft 14 could carry the rotor of a variable condenser, used for tuning the radio. The bearing 16 is provided for the shaft 14, the bearing being attached to the panel 10 by suitable means such as the nuts 18.

The shaft 14 carries a gear, in the embodiment shown the gear being of the composite type 20, 22. The gear 20 is fixed to the hub 24, which is keyed to the shaft 14 by means of the set screw 25. The teeth of gears 20 and 22 coincide, and the gear 22 is urged to rotate relative to gear 20 under action of the spring 26. Spring 26 operates to hold the teeth of composite gear 20, 22 in snug meshing engagement with the companion pinion 32 to eliminate backlash. The antibacklash device embodying the spring 26 is not claimed as part of the present invention.

The pinion 32 is journaled in the bearing 44, that is screw threaded into the housing 11 and fixed thereto by means of the set screw 46. The knob 38 is attached to the shaft 34, in a manner to be described more fully hereinafter, the knob 38 being attached to the bearing bushing 42 to which the dial plate 40 is attached. Rotation of the knob 38 operates to rotate the dial plate 40 and the pinion 32 in unison, the pinion in turn driving the gear 20, 22. The dial plate 40 may include the peripheral indicia shown, and the indicating plate 50 may be provided fixed to the housing 11 and positioned to indicate the angular position of the dial plate 40.

It will be noted that the gear 20, 22 is several times the diameter of the pinion 32 in the embodiment shown, and that each rotation of the pinion 32 produces a limited predetermined angular displacement of the gear 20, 22. It will also be noted that a predetermined fraction of a complete revolution of the gear 20, 22 is coincident with a plurality of revolutions of the pinion 32.

The gear 22 is provided with indicia 28, Fig. 3, which travel past the aperture 30 in the housing 11, and thus are successively placed in view of the observer by rotation of the knob 38. It is desired that the gear 22 be able to rotate through an arc that will enable all of the indicia to pass into view through the aperture 30, but that the gear 22 be prevented from moving those portions of its face in view through the aperture 30 that are beyond the range of indicia 28. Stops 54 and 52 are provided, and these operate to limit the arc of rotation of the gear 22 to the fraction of a complete revolution that is determined by the range of the indicia 28.

The stop 54 is provided attached to the gear 20, 22 by being projected from the face of the hub 24, and it describes a circle that is smaller than the diameter of gear 20, 22. Attached to the pinion 32 to rotate therewith is the stop 52 companion to the stop 54. The stop 52 projects from the rear face of the dial 40, and is positioned to rotate in a plane common to the plane of rotation of the stop 54. The stop 54 describes the circle 56, and the stop 52 describes the circle 57 that intersects the circle 56 at points 58 and 59.

For each rotation of the pinion 32, the stop 52 intersects the circle 56 at points 58 and 59. During coincident rotations of the gear 20, 22 while the stop 54 is located in the larger arc of the circle 56 between the points 58 and 59, the stops 54 and 52 do not meet, and the stop 52 does not interfere with rotation of the gear 20, 22. But when the pin 54 passes the point 58 in its counter-clockwise rotation, or point 59 in its clockwise rotation, the stops 54 and 52 will meet and abut against each other arresting the gear 20, 22 and preventing its continued rotation. A gear ratio between the pinion 32 and gear 20, 22 can be provided to cause the stops 52, 54 to meet precisely at the point 58 during counter-clockwise rotation of the gear 20, 22, and the point 59 during clockwise rotation of the gear 20, 22. This may be undesirable in some cases, and is not essential for practice of the invention.

In the practical application of the principles of the invention disclosed, the stop 52 is extended radially of its circle 57 for it to span the intersecting arcs of circles 56 and 57 between the points 58 and 59. Accordingly, during its counter-clockwise rotation, the stop 54 will abut against the stop 52 wherever they meet after it passes the point 58, and during its clockwise rotation wherever they meet after it passes point 59.

Manual rotation of the knob 38 to cause the stops 54 and 52 to abut and arrest rotation of gear 20, 22 may be severe enough to cause an undue strain on the parts. Means are provided to absorb the shock of the stops 52 and 54 coming into abutting engagement.

The bushing 42, that carries the dial 40 and the knob 38 integral therewith, is mounted to rotate on the bearing sleeve 44 in which the shaft 34 of pinion 32 is journaled. The resilient strand 35 provides a shock absorbing connection between the shaft 34 and the knob 38. The resilient strand 35 is projected diametrically through the shaft 34, as shown in Fig. 2, the strand 35 being projected beyond the surface of the shaft. The ends of the strand 35 are projected into diametrically opposite sockets in the cap 37, that is attached to the knob 38 in fixed engagement therewith by means of the screws 36. The sockets of the cap 37 that receive the ends of the strand 35 are spaced away from the surface of the shaft 34 as shown, to allow suitable lengths of intermediate strand 35 for the proper amount of spring action to be disposed diametrically opposite each other and extending from the surface of the shaft 34 to the knob 38. The strand 35 can be a length of resilient wire.

The drawings disclose one practical application of the principles of the invention, which however is not limited to the specific embodiment disclosed. The scope of the invention is determined by the accompanying claims.

The invention described herein may be manufactured and used by or for the Government of the United States of America for governmental purposes without the payment of any royalties thereon or therefor.

What is claimed is:

1. A gear train comprising a pinion and a gear of greater diameter rotatable on parallel axes, the pinion and gear each comprising a stop attached to rotate with it, the several stops being positioned to rotate in a common plane, the stop of the gear being positioned radially to rotate on a smaller circle than the gear diameter, the stop of the opinion being positioned radially to rotate on a circle that intersects the circle of rotation of the stop of the gear, the stops being located circumferentially on their respective circles of rotation to abut at the intersection between circles, a knob for rotating the driving member of the pinion and gear being coaxial therewith and rotatable relative thereto; resilient means connecting the knob and the driving member to rotate the member by rotation of the knob.

2. A gear train comprising a pinion and a gear of greater diameter rotatable on parallel axes, the pinion and gear each comprising a stop attached to rotate with it, the several stops being positioned to rotate in a common plane, the stop of the gear being positioned radially to rotate on a smaller circle than the gear diameter, the stop of the pinion being positioned radially to rotate on a circle that intersects the circle of rotation of the stop of the gear, the stops being located circumferentially on their respective circles of rotation to abut at the intersection between circles, a shaft carrying the driving member of the pinion and gear, a knob for rotating the driving member being mounted rotatable on the axis of the shaft, a resilient strand projected diametrically through the shaft and extending beyond the surface thereof, the ends of the strand projecting into diametrically opposite sockets in the knob, the sockets being positioned radially away from the surface of the shaft.

3. A gear train comprising a pinion and a gear of greater diameter rotatable on parallel axes, the pinion and gear each comprising a stop attached to rotate with it, the several stops being positioned to rotate in a common plane, the stop of the gear being positioned radially to rotate on a smaller circle than the gear diameter, the stop of the pinion being positioned radially to rotate on a circle that intersects the circle of rotation of the stop of the gear, the stops being located circumferentially on their respective circles of rotation to abut at the intersection between circles, a shaft carrying the driving member of the pinion and gear, a knob for rotating the driving member being mounted rotatable on the axis of the shaft, a wire projected diametrically through the shaft and extending beyond the surface thereof, the ends of the wire projecting into diametrically opposite sockets in the knob, the sockets being positioned radially away from the surface of the shaft.

4. Operating mechanism for a radio dial of the like comprising a pinion and a gear rotatable on parallel axes, the gear ratio between the pinion and the gear providing predetermined angular displacement of the gear for each complete revolution of the pinion and total angular displacement of the gear less than a complete revolution thereof for a plurality of revolutions of the pinion, stops limiting rotation of the gear to the extent of the total angular displacement thereof, the stops being rotatable in a common plane and being attached to rotate with the pinion and the gear respectively, the stop of the gear being positioned radially to rotate on a smaller circle than the gear diameter, the stop of the pinion being positioned radially to rotate on a circle that intersects the circle of rotation of the stop of the gear, and extending radially to span the intersecting arcs, indicia on the gear indicating its angular displacement.

NORMAN E. KLEIN.

REFERENCES CITED

The following references are of record in the file of this patent:

UNITED STATES PATENTS

| Number | Name | Date |
|---|---|---|
| 985,221 | Spear | Feb. 28, 1911 |
| 1,203,840 | Bailey | Nov. 7, 1916 |
| 1,477,785 | Szukalski | Dec. 18, 1923 |
| 1,618,525 | Franklin | Feb. 22, 1927 |
| 1,729,046 | Lovejoy | Sept. 24, 1929 |
| 1,791,641 | Schroder | Feb. 10, 1931 |
| 1,913,288 | Pierce | June 6, 1933 |
| 2,086,035 | Johnson | July 6, 1937 |
| 2,213,492 | Galter | Sept. 3, 1940 |
| 2,294,280 | Carrington | Aug. 25, 1942 |
| 2,349,118 | Simpson | May 16, 1944 |

FOREIGN PATENTS

| Number | Country | Date |
|---|---|---|
| 105,013 | Austria | July 15, 1926 |
| 503,776 | Germany | July 17, 1930 |
| 511,187 | France | Dec. 18, 1920 |